United States Patent [19]

Johnson

[11] E Re. 29,798

[45] Reissued Oct. 10, 1978

[54] IMPACT CRUSHER

[75] Inventor: Louis W. Johnson, Eugene, Oreg.

[73] Assignee: El-Jay, Inc., Eugene, Oreg.

[21] Appl. No.: 778,053

[22] Filed: Mar. 16, 1977

Related U.S. Patent Documents

Reissue of:

[64] Patent No.: 3,873,047
Issued: Mar. 25, 1975
Appl. No.: 343,635
Filed: Mar. 22, 1973

[51] Int. Cl.[2] ..... B02C 13/09

[52] U.S. Cl. ..... 241/275; 241/283

[58] Field of Search ..... 241/99, 274, 275, 283, 241/291, 40, DIG. 10

[56] References Cited

U.S. PATENT DOCUMENTS

| | | | |
|---|---|---|---|
| 3,058,679 | 10/1962 | Adams | 241/275 |
| 3,148,840 | 9/1964 | Behnke | 241/275 |
| 3,151,814 | 10/1964 | Morgan et al. | 241/99 |
| 3,174,697 | 3/1965 | Bridgewater | 241/291 X |
| 3,258,211 | 6/1966 | Behnke | 241/275 |
| 3,652,023 | 3/1972 | Wood | 241/275 |
| 3,756,520 | 9/1973 | Hughs | 241/99 |
| 3,767,127 | 10/1973 | Wood | 241/275 |

FOREIGN PATENT DOCUMENTS

| | | | |
|---|---|---|---|
| 1,044,567 | 11/1958 | Fed. Rep. of Germany | 241/275 |
| 1,290,793 | 3/1969 | Fed. Rep. of Germany | 241/275 |
| 717,546 | 9/1961 | South Africa | 241/275 |

*Primary Examiner*—Howard N. Goldberg
*Attorney, Agent, or Firm*—Klarquist, Sparkman, Campbell, Leigh, Hall & Whinston

[57] ABSTRACT

An impeller assembly having a hard wear plate has replaceable impeller shoes and is rotated on a vertical axis to throw material against vertically reciprocated, replaceable breaker bars to crush the material. The breaker bars are reciprocated by power driven jacks. The material is supplied to the impeller through a spout having a dust-sealing valve. The impeller has a shaft journalled in a sealed impeller shaft housing mounted resiliently on a base, and the shaft is driven by a double universal joint drive. Lubricant is pumped from a sealed input shaft housing into the impeller shaft housing and back to the input shaft housing.

16 Claims, 4 Drawing Figures

IMPACT CRUSHER

Matter enclosed in heavy brackets [ ] appears in the original patent but forms no part of this reissue specification; matter printed in italics indicates the additions made by reissue.

DESCRIPTION

This invention relates to a new and improved impact crusher and more particularly to a wear-distributing impact crusher. Impact crushers known hitherto have had vertical impeller shafts and horizontal impeller discs on each of which are mounted several impeller hammers or shoes, which throw the material to be crushed against impact bars. Such crushers have demonstrated exceptional crushing capacity to produce fine granular size product. Unfortunately, the wear rate of the metal impeller shoes and impact bars has been so excessive and costly that this type of machine has developed an unfavorable reputation. In a typical prior art impact crusher, rock to be crushed is fed into a central area of the impeller much the same as water into a centrifugal pump, and the impeller hammers sling the rock at high velocity against a ring of breaker bars having faces approximately square to the vector path of said rock. Upon striking the bars the rock is shattered. The constant impact of rock in one area of the impact bars soon cavitates the bars and forms rounded pockets. The rock no longer hits squarely and crushing efficiency drops dramatically. Normally, bars must be replaced are readjusted every day or two. Impeller shoes also wear rapidly as the rock slides across their faces.

An object of the invention is to provide a new and improved impact crusher.

Another object of the invention is to provide a wear-distributing impact crusher.

A further object of the invention is to provide an impact crusher having breaker bars adjustable to distribute wear.

Another object of the invention is to provide an impact crusher having breaker bars which are continuously adjusted vertically.

Another object of the invention is to provide an impact crusher having breaker bars reciprocated vertically by sychronized jack-like thrust mechanisms.

Another object of the invention is to provide an impact crusher having replaceable hook-like impeller shoes.

Another object of the invention is to provide an impact crusher having an impeller resiliently mounted.

Another object of the invention is to provide a sealed resiliently mounted bearing housing journalling an impeller shaft and driven by a flexible drive.

Another object of the invention is to provide an impact crusher wherein a resiliently mounted impeller shaft is enclosed in a sealed bearing housing and is driven by an impact drive shaft also in a sealed bearing housing and in which a force feed lubrication system includes a lubricant pump in the latter bearing housing serving to lubricate through the housings in series.

Another object of the invention is to provide an impact crusher including a resiliently mounted impeller shaft driven by an input shaft through a double universal joint.

Another object of the invention is to provide an impact crusher having an impeller and a breaker plate assembly enclosed to contain dust formed during crushing and supplied with material to be crushed through a feed spout having a normally closed valve and opened by material being fed through the spout into the crusher.

IN THE DRAWINGS

Figure 1:
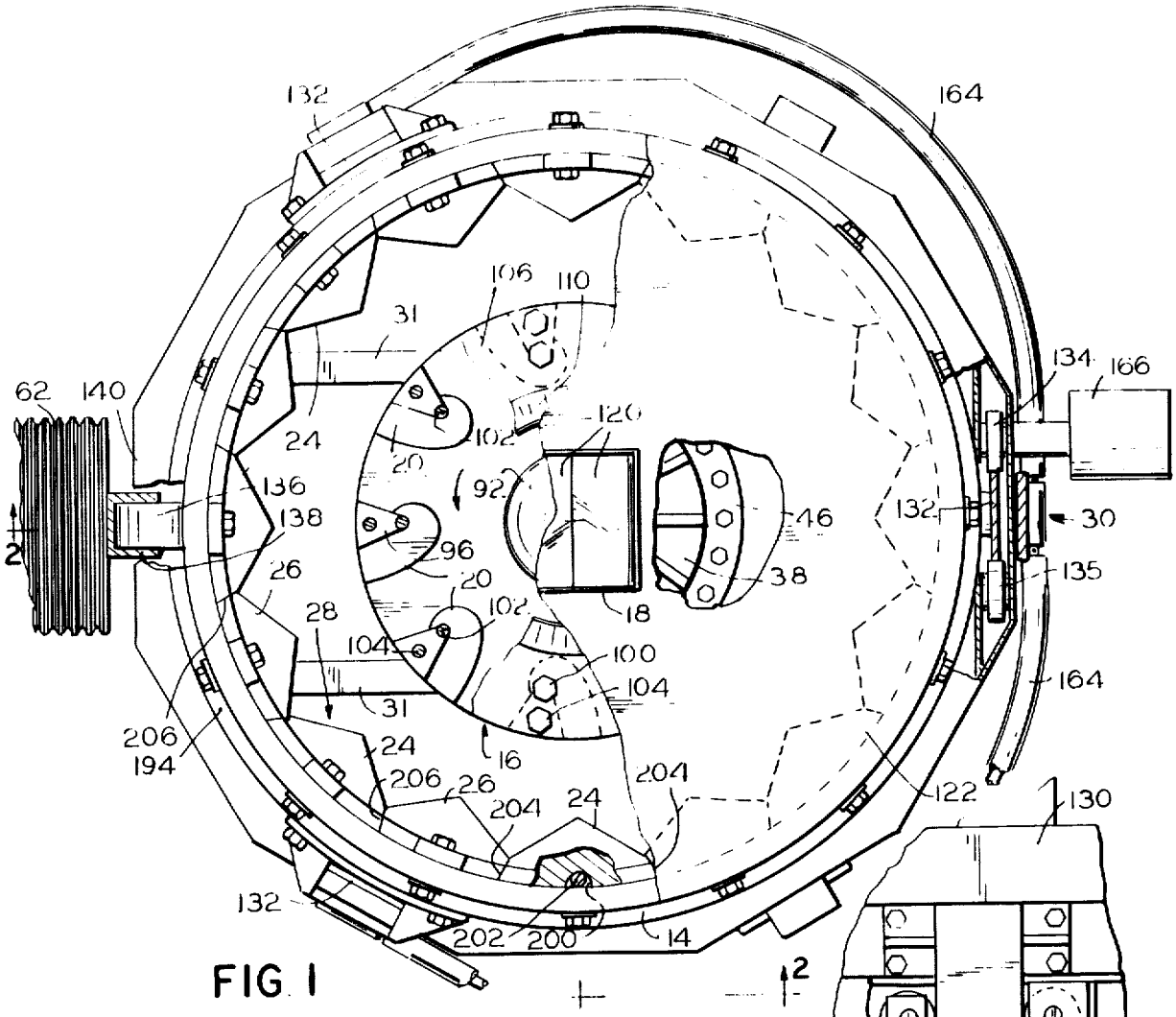
FIG. 1 is a fragmentary, top plan view of a new and improved impact crusher forming one embodiment of the invention.

Referring now in detail to the drawings, there is shown therein a new and improved impact crusher mounted on a support 10 (FIG. 2) and including a generally annular flange 12 stiffening a cylindrical wall or housing 14. The impact crusher includes an impeller assembly 16 supplied with material to be crushed from a feed spout 18 and having hammers or impeller shoes 20 (FIG. 1), which strike and throw the material against elongated, pentagonal breaker bars 24 and 26 of a breaker bar assembly 28 to crush the material. The breaker bar assembly is reciprocated vertically by reversible jack-like thrust mechanisms 30 during the operation to distribute wear evenly over the lengths of the breaker bars.

Figure 2:
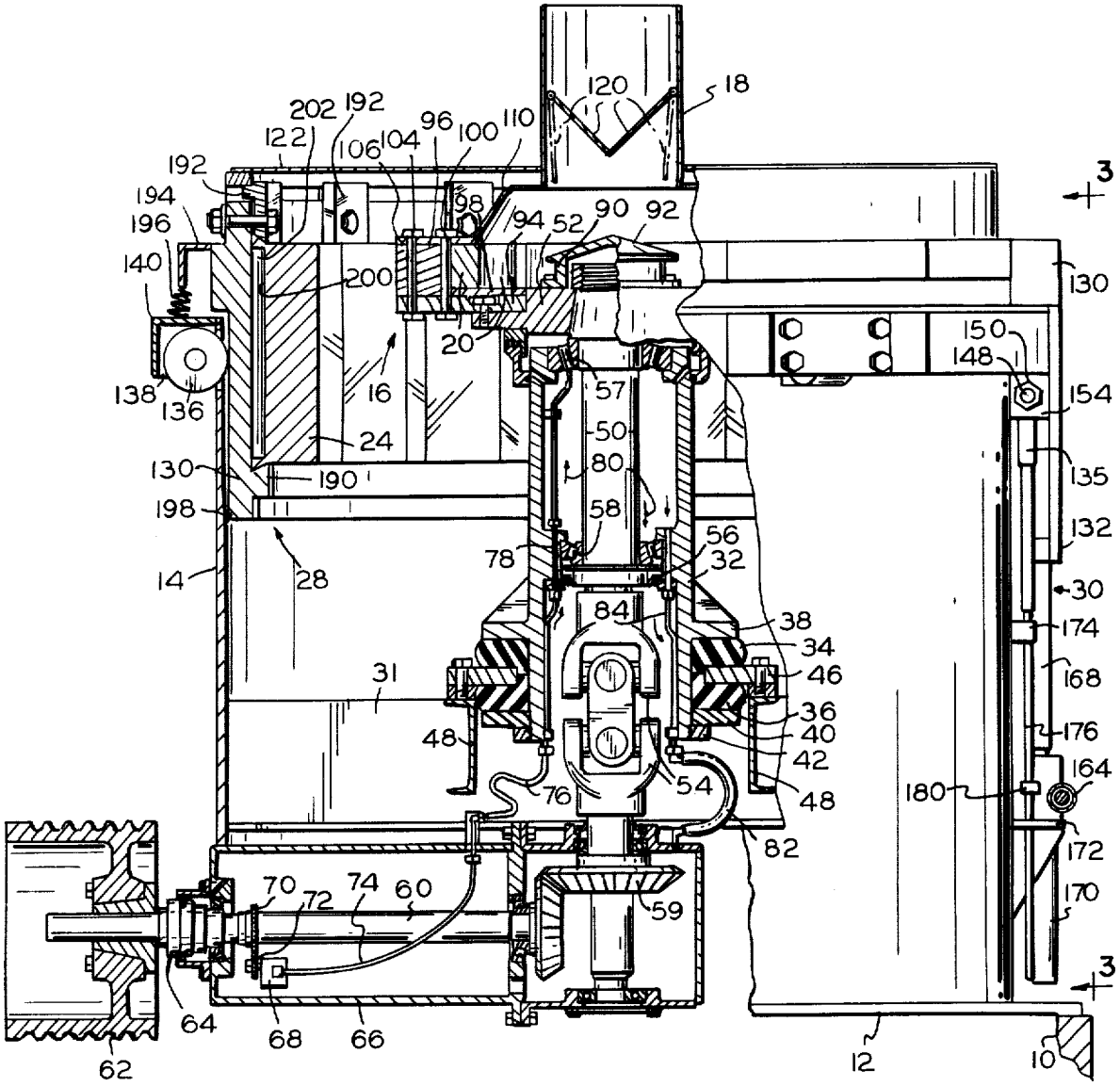
FIG. 2 is a partially sectional, elevation view taken along line 2—2 of FIG. 1.

*As shown in FIG. 2, the impact faces of the breaker bars are flat and parallel to the vertical axis of rotation of the impeller and thus are square to thrown material, and present flat impact surfaces for maximum crushing efficiency.*

The cylindrical wall 14 (FIG. 2) is stiffened by the flange 12 and beams 31 to form the main frame. A vertical impeller shaft housing 32 is resiliently supported by elastomer rings 34 and 36 which are clamped between flange 38 of the housing 32 and ring plate 40. A nut 42 presses ring plate 40 against the lower elastomer ring to obtain any desired preload. A ring plate 46 is located between the elastomer rings. The ring plate 46 is bolted to beams 48 secured to the beams 31. An impeller shaft 50 is journalled within the housing 32 and has its upper end tapered and threaded to receive an easily attached and easily removable heavy hub 52. At its lower end is attached a double universal joint coupling 54 which could be replaced by any of several forms of flexible couplings. I prefer the double universal joint. A seal 56 prevents leakage of oil by having spring loaded faces in lightly loaded contact. Radial and thrust bearings 57 anad 58 journal the impeller shaft in the housing 32.

A right angle bevel gear drive 59 couples to the coupling 54, and is driven by an input drive shaft 60 driven by a drive sheave 62. A seal 64 excludes outside contaminants and retains lube oil in a gear case or input drive shaft housing 66. A unidirectional pump 68 in the housing 66 and driven by the shaft 60 through gears 70 and 72 always pumps oil in one direction regardless of its rotation. The sheave 62 is driven by a suitable source of power (not shown) through V-belting. The source of power preferably is selectively reversible to drive the crusher in either direction.

An oil line 74 joins pump 68 to a flexible line 76 which, in turn, joins to a rigid line 78. At the upper open end of the line 78, oil sprays into the upper bearing 57 on shaft 50. A small hole in the line 78 sprays oil onto the lower bearing 58 providing immediate lubrication before the oil draining from the upper bearing can pass through the lower bearing. Arrows 80 (FIG. 2) show the oil rising in the oil lines and draining back toward the gear case 66. A flexible hose 82 connects rigid drain line 84 to the oil filled gear case 66 from which the pump 68 picks up the oil.

A nut 90 forces hub 52 tightly onto the impeller shaft 50. A cap 92 protects the nut 90 and the shaft 50 against the rock falling through the feed duct or spout 18. Bolted to the hub 52 is heavy impeller disc 94 having several brackets 95 (FIG. 1) attached thereto. These brackets 96 are very firmly attached by welding and bolting because they must cope with the tremendous energy of high horsepower, centrifugal forces, and pressure of slinging the rock being crushed.

Secured to the top of the disc 94 is a metal wear disc 98 made of wear resistant material. The disc 98 absorbs the wear of sliding and falling rock and may be replaced as required. The disc 98 is shaped to closely fit around each of brackets 96, and a boss on the hub 52, and extends to the rim of the impeller disc 94 and yet has sufficient clearance to be easily installed or removed by hand.

Bolts 100 and 104 mount hammers or impeller shoes 20 on the brackets 96 and on top of wear disc 98. Bolts 100 (FIG. 1) are supported rigidly radially by fitting against the inner faces of the brackets 96 and pass through holes in the disc 94 and thread into nuts beneath the disc. Inner radii or hook portions 102 of the hammers 20 fit snugly around these bolts. The hook portion of each hammer holds it against the enormous centrifugal force. The hammers 20 are reversible for opposite rotation of the impeller.

The design of this machine is for either rotation of the impeller as dictated by the wear pattern of breaker bars 24 and 26.

The bolts 104 pass through the brackets 96 and the disc 94 and thread into a nut beneath the disc.

A cap plate 106 is a ring of wear resistant metal placed above the hammers. Bolts 100 and their companion bolts 104 pass through the cap plate 106 and the brackets 96 and the disc 98 and are tightened. The cap plate 106, the hammers 20 and the disc 98 are firmly held against all stresses. A conical frustum 110 (FIG. 2) is part of the cap plate 106 and guides incoming rock into the passageways between the hammers.

Figure 4:
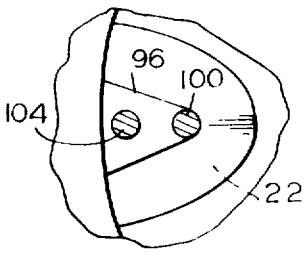
FIG. 4 is an enlarged, fragmentary, top plan view of an alternate impeller shoe construction of the impact crusher of FIG. 1.

The hammers may be all "full" hammers 22, as shown in FIG. 4, which permit either hand rotation without repositioning as is required of hammers 20, or the hammers may be all "half" hammers 20. However, the hammers 22 should have fewer brackets to permit the wider spacing required to provide adequate passageways.

One of the advantages of my design is the easy replacement of the disc 94, which will permit the operator of this machine to use either the disc 94 designed for the hammers 20 or another having more widely spaced brackets for the hammers 22.

Because of the spinning action, the impeller assembly 16 acts as a very effective blower, which would, if not prevented, discharge great clouds of dust, as fine rock granules, into the ambient air. To control and minimize this, I have two plates 120 (FIG. 2) in the feed spout 18. Plates 120 are hinged at the opposite of two sides of the spout and are spring loaded. Spring tension is sufficient to bias the plates upwardly and together against the slight air pressure, but the weight of incoming rock pushes the plates apart. This valve restricts air flow and reduces the pumping action of the impeller to the extent that blowing dust is not a problem. A sectionalized cover 122 further restricts air currents and acts as a safety shield to internal parts and prevents rocks being thrown out of the top of the machine.

A heavy walled cylinder 130 (FIG. 2) fits inside the housing 14 with adequate clearance uniformly around its full circumference to prevent rubbing contact. The cylinder 130 has three or more parallel guide rails 132 (FIG. 3) bolted to its reinforcing wall and evenly spaced apart around the cylinder and projecting downwardly outside of the housing 14. The guide rails are exactly parallel to the center line of the cylinder. On each side of each guide rail are rollers or slides 134 and 135 defining guideways or slides. The rollers 135 are adjustable to aid in centering the cylinder 130 in the housing 14 and to control clearances on each rail. The rollers 134 are mounted by a frame 142 (FIG. 3) bolted to lug 144 welded to housing 14. The rollers 135 are carried by a frame 145 pivoted on pin 146 supported by an eye bolt 148 adjustably secured by nuts 150 and 152 to a lug 154 welded to the housing 14.

Three or more rollers or slide pads 136 (FIG. 2) assist in keeping the cylinder 130 centered in the housing 14. The rollers 136 are mounted by brackets 138 under an overhanging flange 140.

Figure 3:
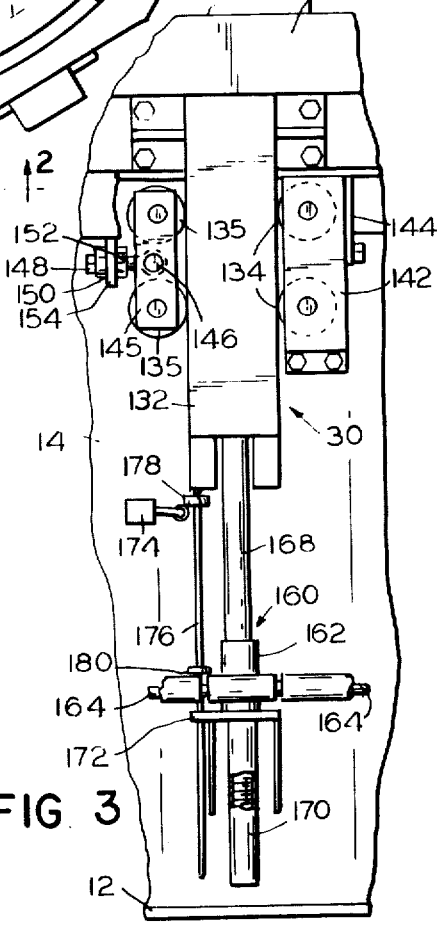
FIG. 3 is a fragmentary, vertical sectional view taken along line 3—3 of FIG. 2.

At the lower end of each guide rail 132 is attached an in line, jack-like, thrust mechanism or ram 160 (FIG. 3) shown in the form of a jackscrew but which may be a hydraulic ram. FIG. 3 shows a ballscrew drive 162 driven by a worm gear reducer. A flexible cable drive 164 connects each gear reducer of all such reducers. A motorized gear reducer drive 166 (FIG. 1) is connected into the flexible cable drive 164. The drive 166 is of reversible rotation design. The rams 160 are shielded from contamination by telescoping shields 168 and cap shields 170 (FIG. 2). A bracket 172 supports each ram. A limit switch 174 (FIG. 3) is mounted on the housing 14 and has reversing and adjustable time delay characteristics. Rods 176 are attached to guides 132. On rods 176 are adjustable stops 178 and 180, which can be set to contact the switch 174 at any length of travel. A comparable control can be used with hydraulic rams, valves, valve stops, hydraulic lines, and a pump replacing the mechanical system. I have shown mechanical design because it is easier to maintain equal travel on all units.

The cylinder 130 (FIG. 2) has a lower dovetail flange 190 upon which rest the breaker bars 24 and 26. The upper end of these bars are held against the cylinder 130 by clamps 192 bolted through the cylinder 130. Wedge bolts could be used as well as threaded bolts. A flange 194 encircles the cylinder 130 and acts both as a stiffener and a means of attaching a flexible curtain 196 to act as a dust seal. Dust must be kept away from the space between the housing 14 and the cylinder 130 to prevent build-up and binding. A flexible scraper seal 198 keeps dust from entering from below.

Each of the breaker bars 24 has a recess or groove 200 (FIGS. 1 and 2) parallel to centerline. A cleat 202 is welded to the cylinder 130. The bars 24 have outward angled edges 204 (FIG. 1) and they are installed first over each cleat. The bars 26 have inward angled edges 206 (FIG. 1) to permit installation and they fit snugly against bars 24 but do contact the inner face of the cylinder 130 with a slight clearance between the bars 24 and 26. These bars are made of the hardest, most abrasion resistant material that is economical to use. The hammers 20 and 22 are made of similar material.

OPERATION

Having described the construction of the machine, I now describe how it operates.

The machine is installed on the suitable support or foundation 10 (FIG. 1) either stationary or portable. A means of feeding rock to it and removing the crushed product are obvious and always provided. Adequate power is connected to drive sheave 62 by belting or possibly direct connection. It is very useful to provide a means of varying the speed either by changing engine speed or changing pulley ratios. As the drive sheave 62 turns, it drives bevel drive gear 59 which, in turn, drives through coupling 54 and shaft 50, and, finally, spins the impeller assembly 16.

Rock is fed into spout 18, plates 120 opening to whatever extent necessary. The hammers 20 accelerate the rock to high speed and fling the rock against the bars 24 and 26, which shatters the rock. This is basic to improved crushers, but where my design is unique now comes into effect. The drive 166 is energized, and very slowly the entire assembly of the cylinder 130 and its attached parts rise[.] *to effect progressive wear of the breaker bars.* When the lower stop 180 contacts the limit switch 174, upward travel ceases. A time delay of whatever period is desired now occurs. At the termination of the time delay, the drive 166 reverses and lowers the assembly until the upper stop 178 contacts the limit switch. Again the time delay occurs. A complete cycle can be programmed to be of short travel, full travel, or concentrated in one area to achieve uniform wear along the entire length of every breaker bar. *Thus, the flat impact surfaces are maintained substantially flat by the uniform and constant wear during rotation of the impeller so as to maintain crushing efficiency at an optimum. The jackscrews 160 and the motor 166 are primary parts of a drive means for the breaker bars. The switch 174 and the stops 178 and 180 are primary parts of a control means for the motor means 166.* This system eliminates the pocketing of the prior art impact crushers. Efficiency is greatly improved and wear parts can work to maximum utilization. Impeller rotation can be reversed and the other faces of the breaker bars 24 can be used. If the hammers 20 are used, they are flopped over and set on the other side of the brackets 96.

In the event of uneven wear on the hammers, or the loss of a hammer, the center of rotation of the impeller assembly 16 will no longer be concentric with the shaft 50, the resulting vibration force is very great in other makes of machines that have their shaft housing rigidly attached to their main frame. My design eliminates this problem due to the resilient mounting in elastomer pads 34 and 36, as previously described. When unbalance occurs, the resilient material flexes and permits unbalanced operation without problems. The constant velocity of the double universal joint 54 eliminates varying speed waves as would occur with a single joint.

The spout 18 is held in fixed relation to the main cylindrical wall or housing 14 by a support (not shown) which bridges over the rising and lowering breaker bar assembly. This is necessary to properly receive feed and distribute the feed into conical frustum 110.

If desired, the guide rollers 134, 135 and 136 could be replaced by guides of a non-metallic low friction material such as, for example, micarta, teflon or the like.

What is claimed is:

1. In an impact crusher:

base means, a rotary impeller mounted on the base means for rotation on a vertical axis, drive means for rotating the impeller to centrifugally throw material to be crushed through a predetermined annular zone around the impeller, annular breaker bar means, mounting means mounting the breaker bar means [adjustably] *movably* on the base means in positions surrounding said annular zone,

*said breaker bar means presenting flat impact surfaces parallel to the vertical axis and normal to the path of thrown material to achieve maximum impact,* and [adjustment] *drive* means for moving the breaker bar means *during rotation of the impeller and as the breaker bar means is being worn* [relative to the base means], *said drive means including motor means for driving the breaker bar means, and control means automatically effecting reversal of the motor means at periodic intervals to cause reciprocation of the breaker bars so that the breaker bars are progressively moved* to vary the portion of the breaker bar means impacted by the thrown material to distribute wear *evenly* over a large area of the breaker bar means *so that the breaker bar means continues to present to thrown material impact surfaces that are substantially flat for maximum impact efficiency.*

2. The impact crusher of claim 1 wherein the [adjustment] *drive* means moves the breaker bar means vertically relative to the impeller.

[3. The impact crusher of claim 2 wherein the adjustment means reciprocates the breaker bar means.]

4. The impact crusher of claim [3] *2* wherein the [adjustment] *drive* means comprises a plurality of expansible thrust mechanisms mounted in spaced positions around the impeller.

a drive mechanism.

and drive coupling means connecting the drive mechanism to the thrust mechanisms to drive the thrust mechanisms at the same rate of speed.

5. The impact crusher of claim 4 wherein each thrust mechanism comprises a reversible jack screw.

6. The impact crusher of claim 5 [including reversing means, and] *wherein said control means comprises* adjustable stopping means moving with and attached to the breaker bar means.

7. The impact crusher of claim 2 wherein the mounting means includes vertical guide means mounted on the base means and guide rail means on the breaker bar means guided by the guide means.

8. The impact crusher of claim 7 wherein the guide rail means comprises a plurality of guide rails spaced around the breaker bar means.

the guide means including a plurality of pairs of rollers engaging opposite sides of the guide rails and a plurality of radial thrusting rollers engaging the breaker bar means.

9. The impact crusher of claim 1 wherein the base means includes a vertical, cylindrical housing, the breaker bar *means* having a cylindrical exterior and extending loosely into the cylindrical housing, *said breaker bar means having a portion projecting from said housing, said drive means being connected to said projecting portion.*

10. The impact crusher of claim 9 including [a flexible scraping ring mounted on] *sealing means between* the lower end of the breaker bar means and [engaging the inner wall of] the cylindrical housing, *and sealing*

*means between the upper end of said breaker bar means and said housing.*

[11. The impact crusher of claim 9 including extensible sealing curtain means secured to the upper portion of the breaker bar means and to the upper portion of the housing.]

12. The impact crusher of claim 2 wherein the breaker bar means includes an outer, hollow cylinder, segmental breaker bars, and releasable fastening means securing the breaker bars to the inner surface of the hollow cylinder.

13. The impact crusher of claim 12 wherein the breaker bars and the hollow cylinder have lower interlocking dovetail portions, and the fastening means includes clamps bolted to the hollow cylinder and having dovetail portions interlocking with upper dovetail portions of the breaker bars.

[14. The impact crusher of claim 12 wherein each breaker bar is pentagonally shaped to form an angular impact surface, the drive means being reversible.]

[15. In an impact crusher, a base, a rotary impeller, means mounting the rotary impeller on the base for rotation about a vertical axis.

reversible drive means for selectively rotating the impeller in opposite directions, non-rotating annular breaker bar means surrounding the impeller and having a first series of impact surfaces substantially normal to the path of material thrown by the impeller when the impeller is rotated in one direction and also having a second series of impact surfaces substantially normal to the path of material thrown by the impeller when the impeller is rotated in the opposite direction, and means to elevate and lower said breaker bar means repetitiously within adjustable limits.]

[16. The impact crusher of claim 15 wherein the impact surfaces of the breaker bar means are arranged in angular positions.]

17. In an impact crusher, an impeller shaft, an impeller mounted on the impeller shaft, a vertical shaft housing, bearing means in the housing journaling the shaft in the housing, annular impact means surrounding the impeller, drive shaft means for driving the impeller shaft, flexible coupling means connecting the drive means to the impeller shaft, a base, means mounting the impact means on the base, resilient means mounting the impeller shaft housing on the base, and means mounting the drive means on the base.

18. The impact crusher of claim 17 wherein the flexible coupling means includes double universal joint means.

19. The impact crusher of claim 17 wherein the shaft housing has an annular flange and the resilient means includes a pair of elastomeric discs on the shaft housing, an annular plate positioned between the discs and supported by the base, a washer-like plate bracketing the discs with the annular flange, and a nut threaded on the shaft housing to press the washer-like plate toward the annular flange to clamp the discs and the annular plate between the washer-like plate and the annular flange.

20. The impact crusher of claim 17 including upper rotary sealing means between the upper ends of the housing and the shaft, lower rotary sealing means below the bearing means and between the shaft and the housing, a lubricant supply pipe fixed to the interior of the housing and having an outlet near the upper end of the housing, a lubricant drain pipe in the housing extending downwardly from a point above the lower seal means to a point below the lower seal means, a flexible supply conduit connected to the supply pipe, and a flexible drain conduit connected to the drain pipe.

21. The impact crusher of claim 20 wherein the drive means includes drive shaft means connected to the flexible coupling means, a sealed drive shaft housing connected to the drain pipe, a pump driven by the drive means and having an outlet connected to the supply pipe and an inlet connected to the housing.

* * * * *

UNITED STATES PATENT AND TRADEMARK OFFICE

CERTIFICATE OF CORRECTION

PATENT NO. : REISSUE No. 29,798
DATED : October 10, 1978

INVENTOR(S) : LOUIS W. JOHNSON

It is certified that error appears in the above-identified patent and that said Letters Patent are hereby corrected as shown below:

Column 1, line 34, "are" should be --or--.

Column 2, line 53, "anad" should be --and--.

Column 3, line 11, "95" should be --96--.

Column 7, claim 13, line 6, "of" should be --on--.

Column 8, claim 17, line 8, "drive shaft means" should be --drive means--.

Signed and Sealed this

Second Day of January 1979

[SEAL]

*Attest:*

RUTH C. MASON
*Attesting Officer*

DONALD W. BANNER
*Commissioner of Patents and Trademarks*